(12) United States Patent
Sobanski et al.

(10) Patent No.: US 11,964,772 B2
(45) Date of Patent: Apr. 23, 2024

(54) BOUNDARY LAYER DUCTED FAN PROPULSION SYSTEM

(71) Applicant: Raytheon Technologies Corporation, Farmington, CT (US)

(72) Inventors: Jon E. Sobanski, Glastonbury, CT (US); Thomas G. Tillman, West Hartford, CT (US); Stuart S. Ochs, Coventry, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/587,638

(22) Filed: Jan. 28, 2022

(65) Prior Publication Data

US 2023/0242267 A1 Aug. 3, 2023

(51) Int. Cl.
| | |
|---|---|
| *B64D 27/10* | (2006.01) |
| *B64D 27/24* | (2006.01) |
| *B64D 33/02* | (2006.01) |
| *B64D 33/10* | (2006.01) |
| *B64D 27/02* | (2006.01) |

(52) U.S. Cl.
CPC .............. *B64D 33/02* (2013.01); *B64D 27/10* (2013.01); *B64D 27/24* (2013.01); *B64D 33/10* (2013.01); *B64D 27/026* (2024.01); *B64D 2033/024* (2013.01)

(58) Field of Classification Search
CPC . B64D 27/20; B64D 27/14; F02C 7/04; F02C 7/32; F02C 6/02; F02C 6/00; F02C 7/275; F02K 1/52
See application file for complete search history.

(56) References Cited

U.S. PATENT DOCUMENTS

| | | | | |
|---|---|---|---|---|
| 2,477,637 | A | * | 8/1949 | Mercier .................. F02K 5/023 244/209 |
| 3,465,990 | A | | 9/1969 | Holland, Jr. |
| 3,576,300 | A | * | 4/1971 | Palfreyman ............ B64D 27/20 244/1 N |

(Continued)

FOREIGN PATENT DOCUMENTS

| | | |
|---|---|---|
| EP | 4148249 A1 | 3/2023 |
| FR | 747754 A | 6/1933 |

(Continued)

OTHER PUBLICATIONS

European Search Report for European Application No. 23154057.6 dated Jun. 12, 2023.

(Continued)

*Primary Examiner* — Thuyhang N Nguyen
(74) *Attorney, Agent, or Firm* — Carlson, Gaskey & Olds, P.C.

(57) ABSTRACT

An aircraft propulsion system includes a propulsive fan assembly configured for assembly into an aircraft structure, the propulsive fan assembly that includes a fan rotatable about a fan axis, an inlet duct assembly disposed within the aircraft fuselage, the inlet duct assembly that includes an upper inlet duct with an upper inlet opening and a lower inlet duct with a lower inlet opening. The upper inlet duct and the lower inlet duct merge into a common inlet duct forward of the propulsive fan assembly, and an outlet duct is disposed aft of the propulsive fan assembly.

20 Claims, 5 Drawing Sheets

(56) References Cited

U.S. PATENT DOCUMENTS

| | | | | |
|---|---|---|---|---|
| 4,375,276 A | * | 3/1983 | Konarski | F02K 1/625 |
| | | | | 239/265.29 |
| 6,634,595 B2 | * | 10/2003 | Koncsek | F02C 7/042 |
| | | | | 137/15.1 |
| 9,611,034 B1 | * | 4/2017 | Suciu | B64D 27/20 |
| 10,006,361 B2 | * | 6/2018 | Bailey Noval | F02C 7/36 |
| 10,676,205 B2 | | 6/2020 | Niergarth et al. | |
| 10,773,813 B2 | * | 9/2020 | Bordoni | B64D 29/00 |
| 10,800,539 B2 | | 10/2020 | Niergarth et al. | |
| 11,105,340 B2 | | 8/2021 | Cheung et al. | |
| 2007/0120009 A1 | | 5/2007 | Kelnhofer | |
| 2008/0098719 A1 | * | 5/2008 | Addis | F02K 3/077 |
| | | | | 60/262 |
| 2013/0011244 A1 | | 1/2013 | Hao et al. | |
| 2015/0191250 A1 | * | 7/2015 | DeVita | B64C 27/12 |
| | | | | 701/3 |
| 2015/0291285 A1 | * | 10/2015 | Gallet | F01D 13/02 |
| | | | | 415/60 |
| 2017/0081037 A1 | * | 3/2017 | Marrinan | B64D 29/04 |
| 2017/0175565 A1 | * | 6/2017 | Sennoun | F02C 6/14 |
| 2018/0051716 A1 | | 2/2018 | Cheung et al. | |
| 2020/0040765 A1 | | 2/2020 | Walsh et al. | |
| 2020/0180771 A1 | | 6/2020 | Moore et al. | |

FOREIGN PATENT DOCUMENTS

| | | |
|---|---|---|
| WO | 2008017567 A1 | 2/2008 |
| WO | 2020239899 A2 | 12/2020 |

OTHER PUBLICATIONS

European Search Report for European Application No. 23154067.5 dated Jun. 13, 2023.

* cited by examiner

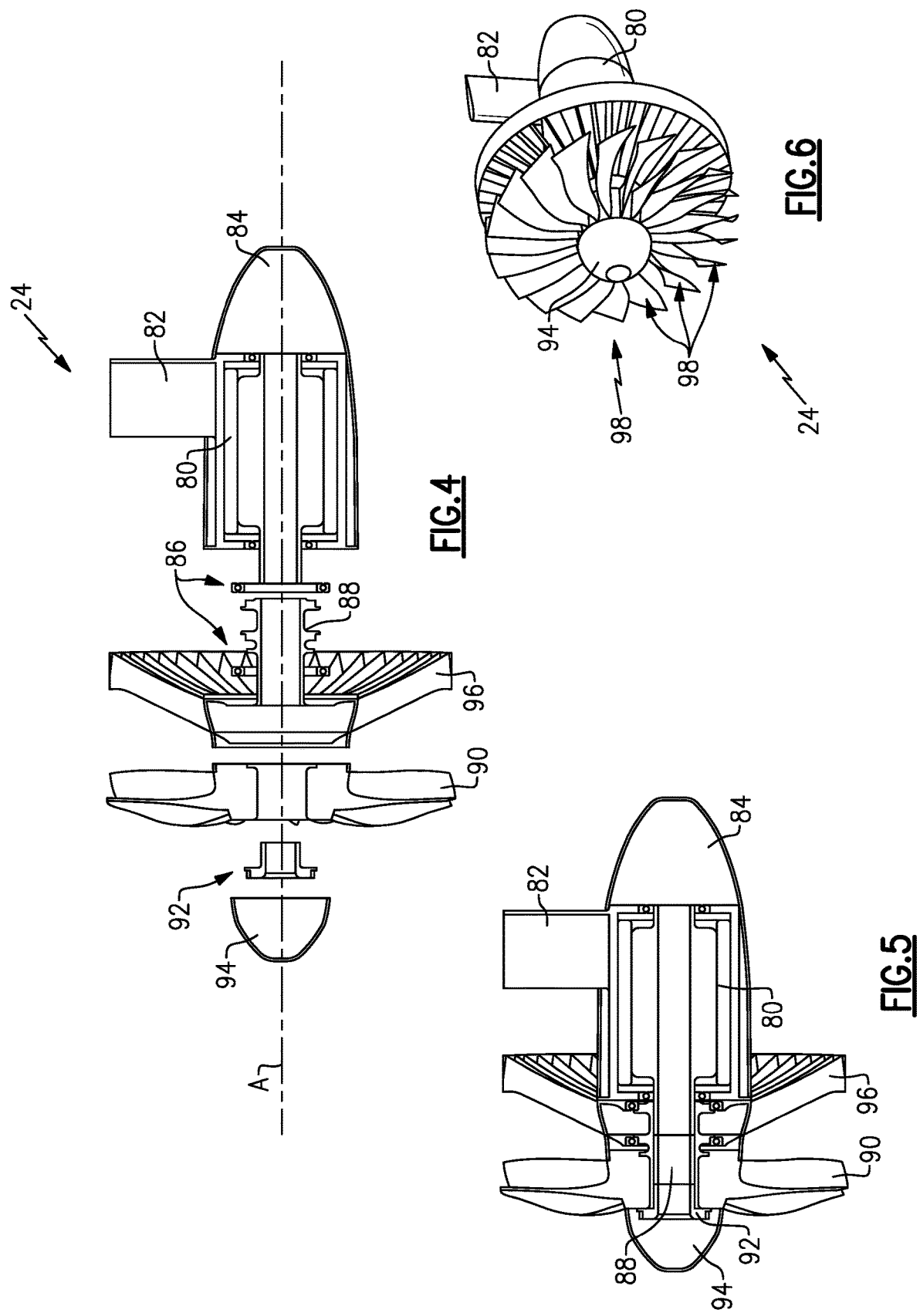

BOUNDARY LAYER DUCTED FAN PROPULSION SYSTEM

BACKGROUND

Aircraft propulsion systems use a gas turbine engine that burns carbon based fuels. The aircraft industry desires to significantly reduce carbon emissions produced by aircraft propulsion systems. Engine systems disposed within an aircraft structure provides several benefits to engine operational efficiencies. However, incorporation of propulsion systems within an airframe present challenges to existing engine architectures. Although current gas turbine engine systems have improved propulsive efficiency, aircraft engine manufacturers continue to seek further improvements to engine performance including improvements to thermal, transfer and propulsive efficiencies.

SUMMARY

An aircraft propulsion system according to an exemplary embodiment of this disclosure, among other possible things includes a propulsive fan assembly configured for assembly into an aircraft structure, the propulsive fan assembly that includes a fan rotatable about a fan axis, an inlet duct assembly disposed within the aircraft fuselage, the inlet duct assembly that includes an upper inlet duct with an upper inlet opening and a lower inlet duct with a lower inlet opening. The upper inlet duct and the lower inlet duct merge into a common inlet duct forward of the propulsive fan assembly, and an outlet duct is disposed aft of the propulsive fan assembly.

In a further embodiment of the foregoing, at least one of the upper inlet duct and the lower inlet duct are rectilinear shaped and the common inlet duct is curvilinear shaped.

In a further embodiment of any of the foregoing, the curvilinear shape is round and matches an outer diameter of the fan.

In a further embodiment of any of the foregoing, the upper inlet duct and the lower inlet duct are differently sized.

In a further embodiment of any of the foregoing, the upper inlet duct is larger than the lower inlet duct.

In a further embodiment of any of the foregoing, the aircraft propulsion system includes a splitter that is disposed between the upper duct and the lower duct forward of the common inlet duct.

In a further embodiment of any of the foregoing, the upper inlet opening and the lower inlet opening are configured to be in communication with a boundary layer flow of air along outer surfaces of the aircraft fuselage.

In a further embodiment of any of the foregoing, the outlet duct is configured as a rectilinear shape aft of the propulsive fan assembly.

In a further embodiment of any of the foregoing, the propulsive fan assembly includes an electric motor coupled to drive the fan about the fan axis.

In a further embodiment of any of the foregoing, the aircraft propulsion system includes a heat exchanger that is disposed in at least one of the inlet duct assembly and the outlet duct.

In a further embodiment of any of the foregoing, the aircraft structure includes at least one of an aircraft body or aircraft wing.

An aircraft propulsion system according to an exemplary embodiment of this disclosure, among other possible things includes at least two propulsor assemblies that are disposed within an aircraft structure, each of the at least two propulsor assemblies include a propulsive fan assembly that is configured for assembly into an aircraft fuselage, the propulsive fan assembly includes a fan rotatable about a fan axis, an inlet duct assembly is disposed within the aircraft fuselage, the inlet duct assembly including an upper inlet duct with an upper inlet opening and a lower inlet duct with a lower inlet opening, wherein the upper inlet duct and the lower inlet duct merge into a common inlet duct forward of the propulsive fan assembly, and an outlet duct is disposed aft of the propulsive fan assembly.

In a further embodiment of the foregoing, the at least two propulsor assemblies are disposed side-by-side within the aircraft structure.

In a further embodiment of any of the foregoing, each of at least two propulsor assemblies are commonly configured.

In a further embodiment of any of the foregoing, at least one of the upper inlet duct and the lower inlet duct are rectilinear shaped and the common inlet duct is curvilinear shaped and matches an outer diameter of the fan.

In a further embodiment of any of the foregoing, the aircraft propulsion system includes a heat exchanger that is disposed within at least one of the inlet duct assembly and the outlet duct.

In a further embodiment of any of the foregoing, the aircraft propulsion system includes a splitter that is disposed between the upper duct and the lower duct forward of the common inlet duct.

In a further embodiment of any of the foregoing, the upper inlet opening and the lower inlet opening are configured to be in communication with a boundary layer flow of air along outer surfaces of the aircraft structure.

In a further embodiment of any of the foregoing, the propulsive fan assembly includes an electric motor coupled to drive the fan about the fan axis.

In a further embodiment of any of the foregoing, the aircraft structure includes at least one of an aircraft body or aircraft wing.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is an exploded view of the example propulsor.

FIG. 5 is a cross-section of the example propulsor.

FIG. 6 is a perspective view of the example propulsor.

DETAILED DESCRIPTION

Figure 1:
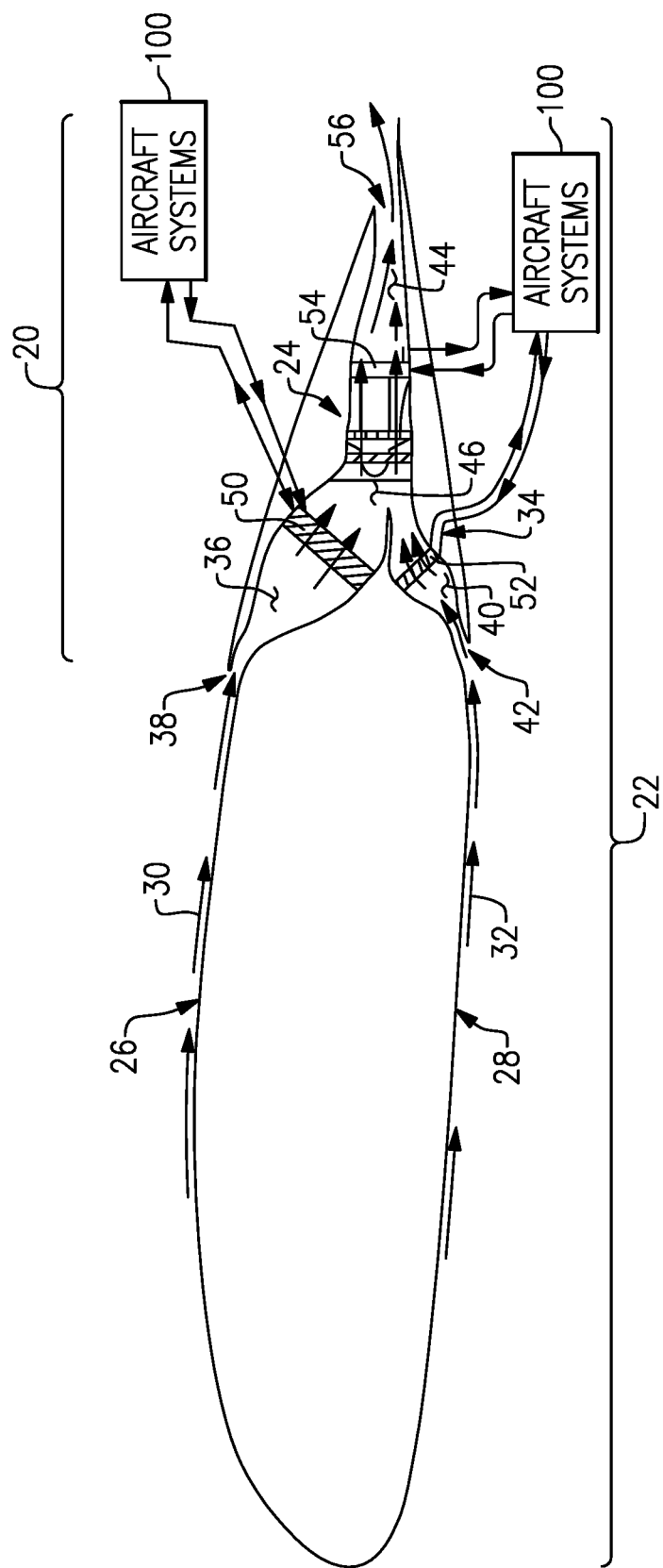
FIG. 1 is a schematic view of an example aircraft propulsion system.

FIG. 1 is a schematic view of an example aircraft propulsion system 20 disposed within an aircraft structure 22. The aircraft structure 22 may be the aircraft fuselage and/or a portion of a wing or other lift generating aircraft structure.

A propulsor assembly 24 is disposed within the aircraft structure 22 and draws an upper boundary layer flow 30 along an upper surface 26 and a lower boundary layer flow 32 from along a lower surface 28 into an inlet duct assembly 34. The propulsor assembly 24 generates thrust and exhausts the ingested flows 30, 32 through an exhaust duct 44.

The inlet duct assembly 34 includes an upper inlet duct 36 and a lower inlet duct 40 that merge into a common inlet duct 46 forward of the propulsor assembly 24. An upper inlet opening 38 is disposed along the upper surface 26 and provides flow communication of the upper boundary layer flow 30 into the upper inlet duct 36. A lower inlet opening 42 is disposed along the lower surface 28 and provides flow communication of the lower boundary layer flow 32 to the lower inlet duct 40. The air flows from the upper inlet duct 36 and the lower inlet duct 40 are merged within the common inlet duct 46 and communicated to the propulsor assembly 24. The propulsor assembly 24 imparts energy to the inlet flows to generate a propulsive flow that is exhausted through an exhaust outlet 56 that is disposed at an aft point of the aircraft structure 22.

Heat exchangers 50, 52 are disposed within the inlet duct assembly 34 to provide thermal rejection and recovery from any of a plurality of aircraft systems schematically indicated at 100. The aircraft systems 100 include hydraulic, electrical, lubrication, cooling air and energy producing systems utilized for operation of the aircraft and the propulsion system 20. It should be appreciated, that although several aircraft systems are disclosed by way of example, any aircraft system that exchanges thermal energy would benefit from this disclosure and is within the scope and contemplation of this disclosure.

It should be appreciated, that the heat exchangers 50, 52 introduce a blockage into the diffused shape of inlet duct assembly 34. The blockage provided by the heat exchangers 50, 52 provides for a more aggressive diffuser shape without separation of incoming boundary layer airflow. The aggressive diffuser shape, in turn, provides for a shorter duct length than would be otherwise be required to provide desired aerodynamic properties. Moreover, the possible diffuser duct shape provides for expanded possible locations of the inlet ducts, and thereby the propulsion system within the aircraft structure 22.

In one disclosed embodiment, the upper inlet duct 36 includes the upper heat exchanger 50 disposed forward of the propulsor assembly 24. A lower heat exchanger 52 is disposed in the lower inlet duct 40 forward of the propulsor assembly 24. Additionally, both the upper heat exchanger 50 and the lower heat exchanger 52 are disposed forward of the common inlet duct 46.

An aft heat exchanger 54 is disposed aft of the propulsor assembly 24 within the exhaust duct 44. The aft heat exchanger 54 provides for recovery of heat generated from the propulsive flow exhausted through the exhaust duct 44.

Figure 2:
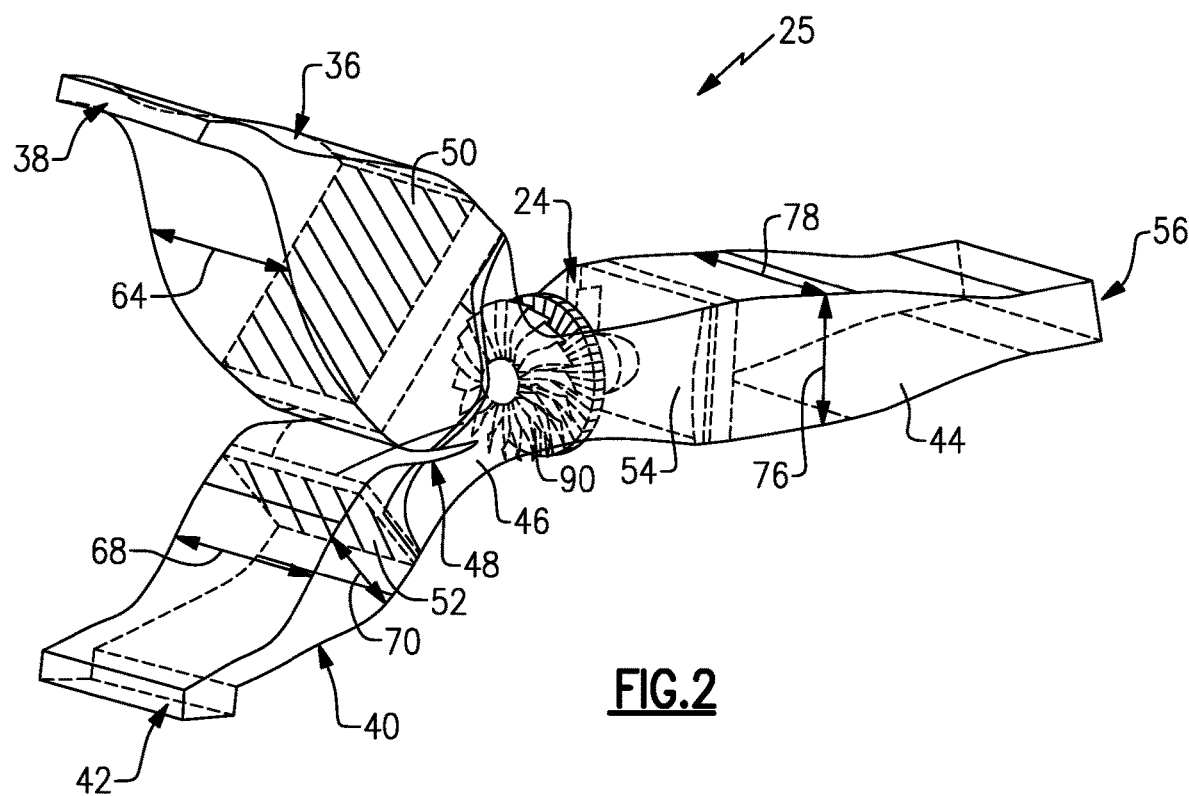
FIG. 2 is a perspective view of an example propulsor assembly.
Figure 3:
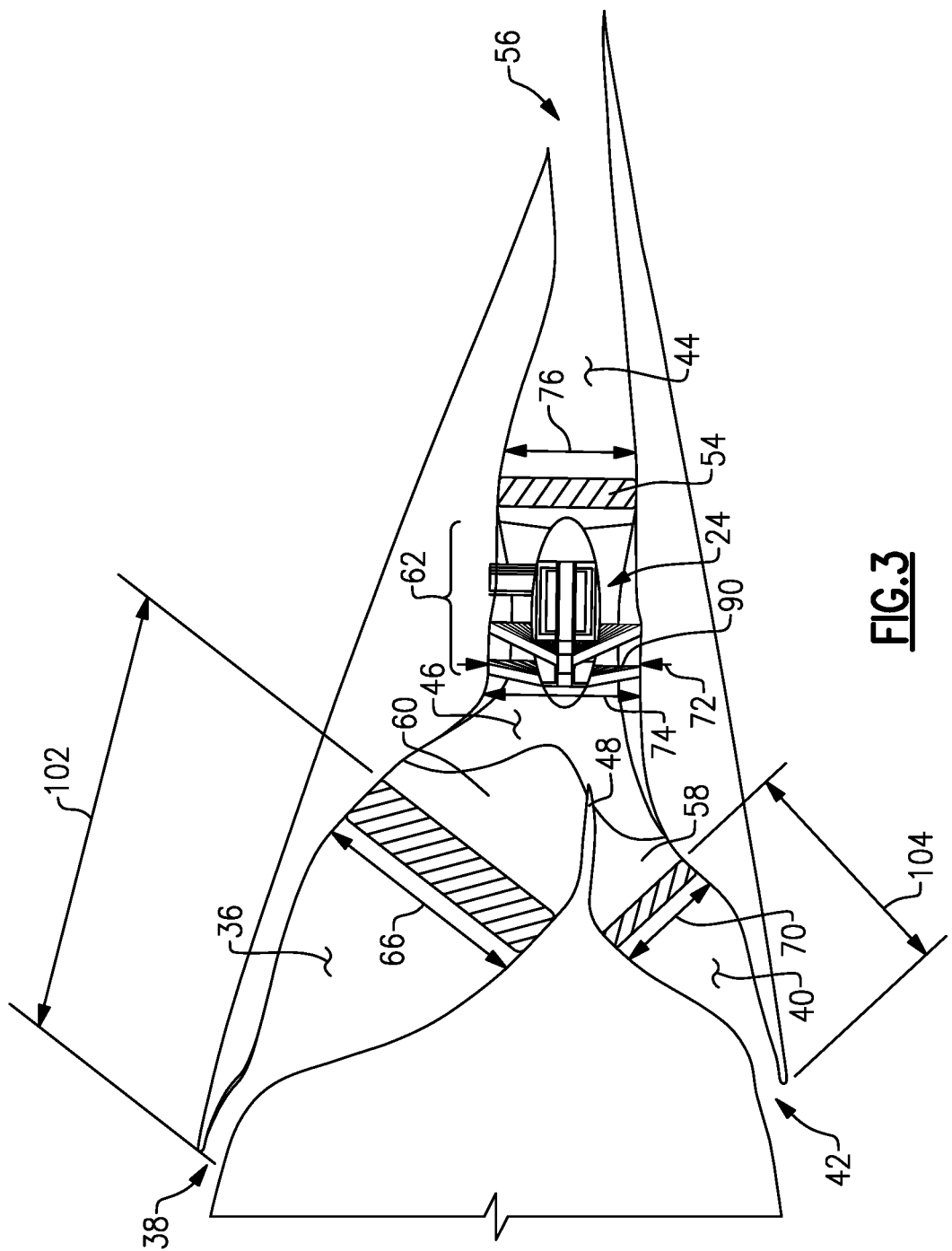
FIG. 3 is an enlarged cross-section of an example propulsor assembly.

Referring to FIGS. 2 and 3 with continued reference to FIG. 1, a splitter 48 is disposed between the upper inlet duct 36 and the lower inlet duct 40 forward of the common inlet duct 46. The splitter 48 mitigates flow separation of the boundary layer flows 30, 32 into the common inlet duct 46.

The upper inlet duct 36 and the lower inlet duct 40 are rectilinear and merge into a curvilinear shaped common inlet duct 46. A lower transition region 58 is disposed between the lower inlet duct 40 and the common inlet duct 46. An upper transition region 60 is provided between the upper inlet duct 36 and the common inlet duct 46. The lower and upper transition regions 58 include contoured shapes that transition from the rectilinear shapes of the upper and lower inlet duct 36, 40 to the curvilinear shape of the common inlet duct 46. The curvilinear shape of the disclosed common inlet duct embodiment ends in a round shape with a diameter 74 that corresponds with a diameter 72 of the propulsor assembly 24. The diameters 74 and 72 correspond by either same or of slightly different sizes to accommodate features of the propulsor assembly 24. The diameter 72 is that of a fan 90 of the propulsor assembly 24.

The exhaust duct 44 is rectilinearly shaped and has a width 78 and a maximum height 76. The height transitions from the maximum height 76 to a reduce height at the exhaust opening 56. The reduced height transition toward the opening 56 forms a nozzle for enhancing propulsive thrust.

The propulsor assembly 24 is disposed within a propulsor space 62 that transitions from the diameter 74 to the rectilinearly shaped exhaust duct 44. The specific shape of the propulsor space 62 may be of a non-uniform shape to accommodate propulsor assembly installation and/or other features of the aircraft structure 22.

The rectilinear shape of the upper inlet duct 36 is rectangular with a height 66 (FIG. 3) and a width 64 (FIG. 2). The lower inlet duct 40 is also rectangular in shape and includes a height 70 (FIG. 3) and a width 68 (FIG. 2). In this disclosed example, the width 64 of the upper inlet duct 36 is the same as the width 68 of the lower inlet duct 40.

The height 66 of the upper duct 36 and the height 70 are maximum heights for each duct 36, 40. The minimum height for each of the ducts 36, 40 is disposed at or near corresponding inlet openings 38, 42. The height of each duct 36, 40 expands outward from the openings 38, 42 toward corresponding maximum heights 66 and 70. In one disclosed example, the maximum heights 66 and 70 are disposed at or near the beginning of corresponding transition regions 58, 60.

The change and transition of height through each of the ducts 36, 40 provide a corresponding change in area for the incoming boundary layer flows 30, 28. The changing area over the length of each duct provides for adjusting airflow parameters to improve efficiency of the propulsor assembly 24. The airflow parameters can include pressure, flow velocity, direction as well as any other known airflow conditions that improve propulsive efficiency.

The height 66 of the upper inlet duct 36 is larger than the height 70 of the lower inlet duct 40. The upper inlet duct 36 includes a length 102 from the opening 38 to the beginning of the transition region 60. The lower inlet duct 40 includes a length 104 between the opening 42 and the beginning of the lower transition region 58. The length 102 is greater than the length 104. Accordingly, in one example embodiment, the upper inlet duct 36 is larger than the lower inlet duct 40. The different sizes between the upper inlet duct 36 and the lower inlet duct 40 provide for the accommodation of differences in boundary layer flows 30, 32 on corresponding upper and lower surfaces 26, 28. Accordingly, it should be appreciated that the relative size of the upper and lower inlet ducts 36, 40 may be modified to accommodate application specific requirements and are within the contemplation and scope of this disclosure. The upper and lower inlet ducts 36 and 40 may be the same size within the scope and contemplation of this disclosure.

The example upper heat exchanger 50 fills the upper inlet duct 36 such that most if not all air flows through the heat exchanger 50. Similarly, the example lower heat exchanger 52 fills the lower inlet duct such that most, if not all air flows through the lower heat exchanger 52. It should be appreciated that the size and configuration of the heat exchangers 50, 52 may vary within the scope of this disclosure.

Referring to FIGS. 4, 5 and 6, the example propulsor assembly 24 is shown apart from the inlet duct assembly 34 and the exhaust duct assembly 40. The propulsor assembly 24 includes an electric motor 80 that is coupled to drive the fan 90 about a fan axis A through a shaft 88. The shaft 88 is supported for rotation by bearing assemblies 86. A forward nut 92 secures the fan 90 to the shaft 88. The fan 90 includes a plurality of fan blades 98 that drive airflow aft to generate thrust. A forward spinner 94 is disposed over the nut 92 to provide a clean aerodynamic shape. The electric motor 80 is supported by a pylon 82 that is connected to a static portion of the aircraft structure 22. An aft faring 84 is secured to an aft portion of the electric motor 80 to provide an aerodynamic structure of airflow into the exhaust duct 44. A fan exit guide vane assembly 96 is disposed axially aft of the fan 90 and directs propulsive airflow into the exhaust duct 44. The fan exit guide vane 96 may further provide supportive structure for the propulsor assembly 24. The fan exit guide vane 96 may include aerodynamically shaped struts that provide a straightening of any airflow exiting the fan 90. Electric power for the electric motor 80 may be provided through electric connections routed through the pylon 82. It should be appreciated, that although one example electric propulsor configuration is provided by way of example, other electrically powered propulsor configurations are within the contemplation of this disclosure. Moreover, although an electric propulsor 24 is disclosed by way of example, other engine configurations that generate power through combustion may also be utilized within the scope and contemplation of this disclosure.

Figure 7:
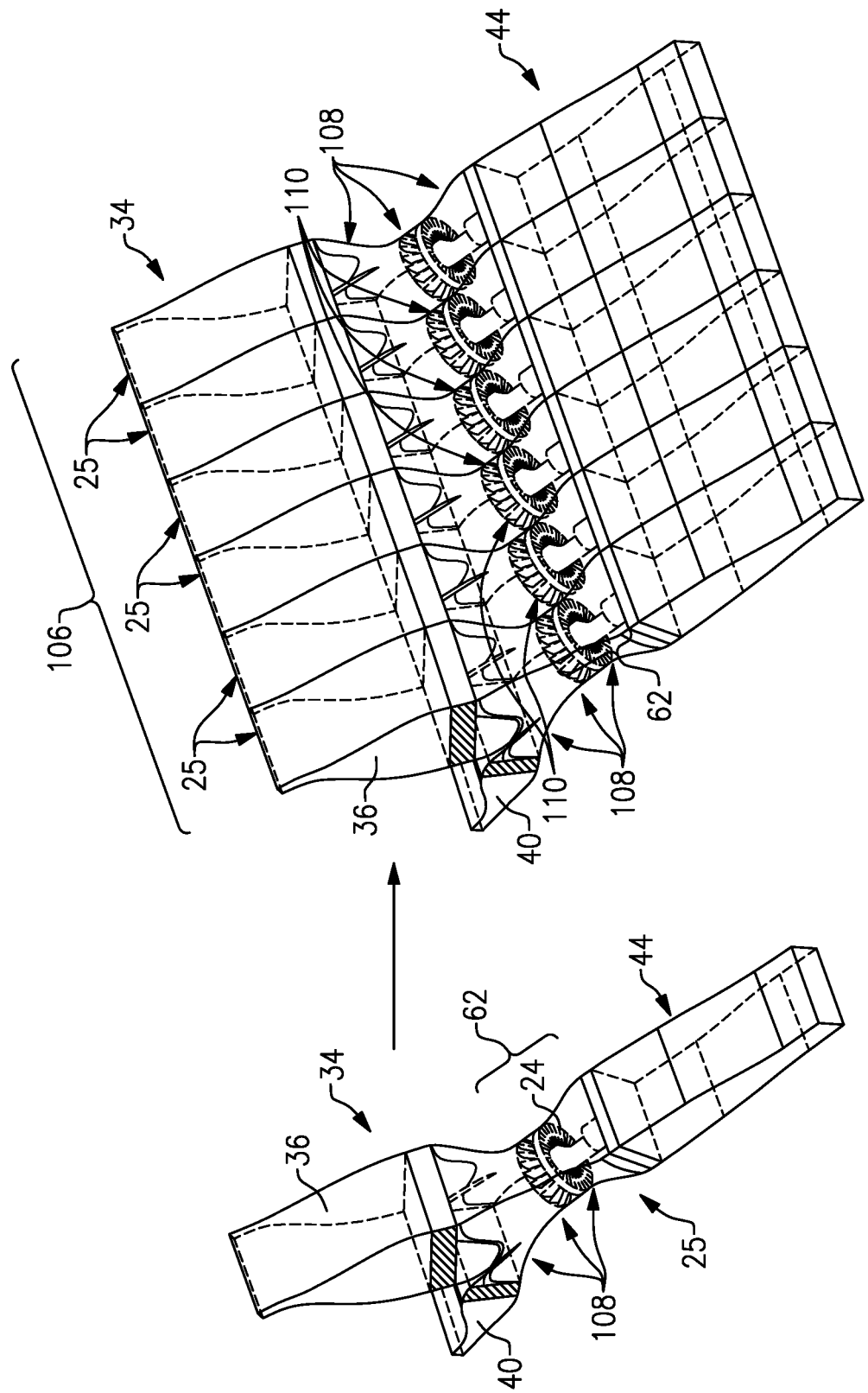
FIG. 7 is a schematic view of an example propulsion system including multiple propulsor assemblies.

Referring to FIG. 7, with continued further reference to FIGS. 1 and 2, an example propulsor system embodiment 106 includes a plurality of propulsor assemblies 24 and corresponding individual duct sectors 25. Each of the duct sectors 25 are separate from the other duct sectors and correspond with one of the individual propulsor assemblies 24. Each propulsor assembly 24 is operable independently such that all of the propulsor assemblies 24 may be operated to provide a combined propulsive thrust. Additionally, the propulsor assemblies 24 may be operated to provide less than full thrust by operating only some of the propulsor assemblies 24 or a subgroup of propulsor assemblies 24.

Each of the propulsor assemblies 24 and separate duct sectors 25 provide for tailoring of the propulsion system 106 to application specific thrust requirements and space constraints. Moreover, the identical configuration for each propulsor assembly 24 and each duct sector 25 simplifies operation and assembly.

The propulsor space 62 defines the within which the propulsor assembly 24 is located and includes an outer contoured shape indicated by arrows 108. The contoured shape 108 provides for open spaces 110 between adjacent propulsor assemblies 24. The open spaces 110 may be utilized to route conduits for coupling aircraft systems 100. The open spaces 110 may also be utilized to for supportive structures needed to support the propulsor assemblies 24.

Accordingly, the example increases overall engine efficiency by providing for ingestion of boundary layer flow and also provides a tailorable propulsor configuration that is adaptable to different aircraft structures.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
a propulsive fan assembly configured for assembly into an aircraft structure, the propulsive fan assembly including a fan rotatable about a fan axis;
an inlet duct assembly disposed within the aircraft structure, the inlet duct assembly including an upper inlet duct with an upper inlet opening and a lower inlet duct with a lower inlet opening, wherein the upper inlet duct and the lower inlet duct each include a height that expands from a minimum height, measured between two opposing surfaces at a corresponding one of the upper inlet opening and the lower inlet opening to a maximum height, measured between the two opposing surfaces, before a transition region and a splitter disposed forward of where the upper inlet duct and the lower inlet duct merge into a common inlet duct forward of the propulsive fan assembly; and
an outlet duct disposed aft of the propulsive fan assembly.

2. The aircraft propulsion system as recited in claim 1, wherein at least one of the upper inlet duct and the lower inlet duct are rectilinear shaped and the common inlet duct is curvilinear shaped.

3. The aircraft propulsion system as recited in claim 2, wherein the curvilinear shape is round and matches an outer diameter of the fan.

4. The aircraft propulsion system as recited in claim 1, wherein the upper inlet duct and the lower inlet duct are differently sized.

5. The aircraft propulsion system as recited in claim 4, wherein the upper inlet duct is larger than the lower inlet duct.

6. The aircraft propulsion system as recited in claim 1, wherein the upper inlet opening and the lower inlet opening are configured to be in communication with a boundary layer flow of air along outer surfaces of the aircraft structure.

7. The aircraft propulsion system as recited in claim 1, wherein the outlet duct is configured as a rectilinear shape aft of the propulsive fan assembly.

8. The aircraft propulsion system as recited in claim 1, wherein the propulsive fan assembly includes an electric motor coupled to drive the fan about the fan axis.

9. The aircraft propulsion system as recited in claim 1, including a heat exchanger disposed in at least one of the inlet duct assembly and the outlet duct.

10. The aircraft propulsion system as recited in claim 1, wherein the aircraft structure comprises at least one of an aircraft body or aircraft wing.

11. The aircraft propulsion system as recited in claim 1, wherein each of the upper inlet opening and the lower inlet opening are rectangularly shaped.

12. An aircraft propulsion system comprising:
at least two propulsor assemblies disposed within an aircraft structure, wherein each of the at least two propulsor assemblies include:
a propulsive fan assembly configured for assembly into an aircraft fuselage, the propulsive fan assembly including a fan rotatable about a fan axis, wherein the propulsive fan assembly includes an electric motor coupled to drive the fan about the fan axis;
an inlet duct assembly disposed within the aircraft fuselage, the inlet duct assembly including an upper inlet duct with an upper inlet opening and a lower inlet duct with a lower inlet opening, wherein the upper inlet duct and the lower inlet duct each include a height that expands from a minimum height at a corresponding one of the upper inlet opening and the lower inlet opening to a maximum height before a transition region and splitter disposed forward of where the upper inlet duct and the lower inlet duct merge into a common inlet duct forward of the propulsive fan assembly; and an outlet duct disposed aft of the propulsive fan assembly.

13. The aircraft propulsion system as recited in claim 12, wherein the at least two propulsor assemblies are disposed side-by-side within the aircraft structure.

14. The aircraft propulsion system as recited in claim 12, wherein each of at least two propulsor assemblies are commonly configured.

15. The aircraft propulsion system as recited in claim 12, wherein at least one of the upper inlet duct and the lower inlet duct are rectilinear shaped and the common inlet duct is curvilinear shaped and matches an outer diameter of the fan.

16. The aircraft propulsion system as recited in claim 12, including a heat exchanger disposed within at least one of the inlet duct assembly and the outlet duct.

17. The aircraft propulsion system as recited in claim 12, wherein the upper inlet opening and the lower inlet opening are configured to be in communication with a boundary layer flow of air along outer surfaces of the aircraft structure.

18. The aircraft propulsion system as recited in claim 12, wherein the aircraft structure comprises at least one of an aircraft body or aircraft wing.

19. The aircraft propulsion system as recited in claim 12, wherein each of the upper inlet opening and the lower inlet opening are rectangularly shaped.

20. The aircraft propulsion system as recited in claim 12, wherein the fan is disposed forward of the electric motor.

* * * * *